United States Patent
Cho et al.

(10) Patent No.: US 7,415,160 B2
(45) Date of Patent: Aug. 19, 2008

(54) TERMINAL AND METHOD FOR TRANSPORTING STILL PICTURE

(75) Inventors: Hyun Duk Cho, Kyonggi-do (KR); Joo Heung Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 11/237,851

(22) Filed: Sep. 29, 2005

(65) Prior Publication Data

US 2006/0023964 A1    Feb. 2, 2006

Related U.S. Application Data

(63) Continuation of application No. 09/619,615, filed on Jul. 19, 2000, now Pat. No. 6,956,971.

(30) Foreign Application Priority Data

Jul. 20, 1999  (KR) .......................... 10-1999-29364
Dec. 17, 1999  (KR) .......................... 10-1999-58562

(51) Int. Cl.
*G06K 9/36*    (2006.01)

(52) U.S. Cl. .................... 382/236; 382/190; 382/243; 382/282; 348/14.02; 348/14.05

(58) Field of Classification Search ................ 382/235, 382/236, 243, 190, 282, 305, 307; 455/3.03, 455/92; 348/14.02, 14.05, 14.13, 14.14, 348/14.15
See application file for complete search history.

(56) References Cited

U.S. PATENT DOCUMENTS

| | | | |
|---|---|---|---|
| 5,159,453 A | 10/1992 | Dhein et al. | |
| 5,161,018 A | 11/1992 | Matsunaga | |
| 5,220,325 A | 6/1993 | Ackland et al. | |
| 5,274,442 A * | 12/1993 | Murakami et al. | 375/240.2 |
| 5,389,965 A * | 2/1995 | Kuzma | 348/14.05 |
| 5,430,486 A | 7/1995 | Fraser et al. | |
| 5,432,769 A | 7/1995 | Honjo | |
| 5,442,771 A * | 8/1995 | Filepp et al. | 709/219 |
| 5,493,329 A * | 2/1996 | Ohguchi | 348/14.13 |
| 5,604,542 A * | 2/1997 | Dedrick | 348/552 |
| 5,608,697 A | 3/1997 | De Haan et al. | |
| 5,657,402 A * | 8/1997 | Bender et al. | 382/284 |
| 5,915,038 A | 6/1999 | Abdel-Mottaleb et al. | |
| 5,966,466 A * | 10/1999 | Miura | 382/236 |
| 5,987,179 A | 11/1999 | Riek et al. | |
| 5,995,666 A | 11/1999 | Nishio et al. | |
| 6,038,257 A | 3/2000 | Brusewitz et al. | |

(Continued)

*Primary Examiner*—Yosef Kassa
(74) *Attorney, Agent, or Firm*—Ked & Associates, LLP

(57) ABSTRACT

Terminal and method for transporting a still picture uses a moving picture terminal after extraction of a frame unit of still pictures, for example, from a moving picture. The extracted still picture frames can be encoded in a fixed quantizing value and stored before transmission, or the stored frame unit still pictures can be encoded in a fixed quantizing value using an overflow control technique or circuit. Further, the extracted still picture frame unit can be repeatedly sent using a varied quantizing value before transmission. Thus, the terminal and method for transporting a still picture permits transmission/reception of the still picture at a higher resolution than a moving picture regardless of time and place to enhance use of the moving picture terminal.

26 Claims, 10 Drawing Sheets

U.S. PATENT DOCUMENTS

| | | |
|---|---|---|
| 6,064,795 A | 5/2000 | Uchide |
| 6,141,341 A * | 10/2000 | Jones et al. ................ 370/352 |
| 6,199,106 B1 * | 3/2001 | Shaw et al. ................ 709/217 |
| 6,236,330 B1 * | 5/2001 | Cohen ..................... 340/691.6 |
| 6,249,268 B1 * | 6/2001 | Tachibana et al. ............. 345/89 |
| 6,308,003 B1 * | 10/2001 | Hirabayashi et al. .......... 386/70 |
| 6,366,622 B1 * | 4/2002 | Brown et al. ............... 375/322 |
| 6,384,862 B1 | 5/2002 | Brusewitz et al. |
| 6,456,337 B1 * | 9/2002 | Kobayashi et al. .......... 348/701 |
| 6,473,065 B1 * | 10/2002 | Fan ............................. 345/82 |
| 6,535,239 B1 * | 3/2003 | Kim ....................... 348/14.02 |
| 6,542,260 B1 * | 4/2003 | Gann et al. ................ 358/471 |
| 6,618,084 B1 * | 9/2003 | Rambaldi et al. .......... 348/247 |
| 6,763,226 B1 * | 7/2004 | McZeal, Jr. ............. 455/90.02 |

* cited by examiner

TERMINAL AND METHOD FOR TRANSPORTING STILL PICTURE

CROSS-REFERENCE TO RELATED APPLICATIONS

This application is a continuation of U.S. patent application Ser. No. 09/619,615, filed on Jul. 19, 2000 now U. S. Pat. No. 6,956,971, the contents of which is incorporated by reference herein.

BACKGROUND OF THE INVENTION

1. Field of the Invention

The present invention relates to transport of a picture, and more particularly, to a moving picture terminal and a method for using same that transports a still picture.

2. Background of the Related Art

As the multimedia communication era arrives, the moving picture terminal has been realized, and will be put into practical service in a near future. Such a moving picture terminal has an encoder and decoder for processing the moving picture for realtime transmission or reception of successive video frames. However, the moving picture terminal cannot transmit/receive a high quality still picture. Therefore, to transport a still picture to an opposite party, a digital camera, a scanner and a computer are used. That is, either the digital camera or the scanner is connected to the computer for transmission of the still picture.

A method for transmitting a still picture by using such as the digital camera, the scanner, and the computer will now be described. FIG. 1 illustrates a related art system for transmitting a still picture.

As shown in FIG. 1, a desired still picture is captured by using a digital camera 100, stored in a computer 102, and transported to an opposite party through a wire or wireless network. On the other hand, if there is no digital camera, a photograph of the object is taken using a conventional camera and scanned by a scanner 101 to capture the still picture. Then, the captured still picture is stored in the computer 102, and transported to the opposite party using the computer 102 through a wire or wireless network.

The encoder and decoder in the related art moving picture terminal will now be described. FIG. 2 illustrates a block diagram showing an encoder in the related art moving picture terminal, and FIG. 3 illustrates a block diagram showing a decoder in the related art moving picture terminal.

Referring to FIG. 2, the encoder in the related art moving picture terminal is provided with a core part 210 for receiving, compressing, and encoding successive picture frames, a VLC 230 and a channel buffer 240. The VLC 230 is for receiving symbols coded in the core part 210 and assigning short length codes to symbols with a high frequency of occurrence in view of probability and relatively long codes to symbols with a low frequency of occurrence for the symbols coded in the core part 210. The channel buffet 240 is for buffering and forwarding data from the VLC 230 and providing a buffer state to a transmission rate controller 201 in the core part 210.

The core part 210 is a DCT 200 for receiving and subjecting a picture data to discrete cosine transform, and a quantizer 202 for quantizing the picture data and providing same to the VLC 230 for compressing the picture frames. The transmission rate controller 201 is for controlling a transmission rate according to quantized values at the channel buffer 240. The core part 210 further includes an inverse quantizer 203 for inverse quantizing the data quantized at the quantizer 202 to restore original picture frames from the coded picture frames, an ICDT 204 for subjecting the DCT data from the inverse quantizer 203 to Inverse Discrete Cosine Transform (IDCT) and a frame memory 220 for storing frames of the picture data restored at the IDCT 204. A motion estimator 206 and a motion compensator 205 are for comparing a received frame and a prior frame, which is the frame stored in the frame memory, to estimate a difference of motions and for compensating the difference.

The operation of the related art encoder will now be described. After compressing input of successive picture frames by subjecting the picture frames to DCT at the DCT 200, the successive picture frames are encoded into a bitstream with different bit lengths at the VLC 230 via the quantizer 202, which discards high frequency terms. The coded bitstream is stored in the channel buffer 240, and transmitted toward the receiver side through a wireless network. In this instance, the channel buffer 240 provides an amount of transmitted data to the transmission rate controller 201, and the transmission rate controller 201 adaptively computes a quantizing value according to the amount of transmitted data and provides the quantizing value to the quantizer 202. Accordingly, a transmission rate of the data transmitted from the channel buffer 240 is controlled. During the above-described process, the core part 210 has the coded picture frames subjected to IDCT through the inverse quantizer 203 and the IDCT 204, to be restored into original picture frames that are stored in the frame memory 220, which can store pictures of one frame amount. The restored original frames are stored for computing a motion difference between incoming successive picture frames and prior picture frames. The motion difference is estimated according to correlation between adjacent picture frames at the motion estimator 206, and the difference is compensated at the motion compensator 205, for making a real time moving picture transmission available.

In this instance, to estimate and compensate for the difference of motions between the adjacent picture frames, at least a first frame of the incoming picture sequence should be coded only with its own frame regardless of the correlation with the adjacent frame. This method of coding is called as "I picture coding", and a method of coding using a correlation with the adjacent frame is called as "P picture coding."

The decoder shown in FIG. 3, which operates opposite to the encoder, will now be described. That is, after being restored into an original picture by subjecting the coded picture frame to inverse quantizing and IDCT at a decoder core part 270, the coded picture frame received through a channel buffer 250 and a VLC 260 is reproduced. The core 270 includes inverse quantizer 271, IDCT 272 and motion compensator 273. Similar to the encoder, the reproduced picture is stored in a frame memory 280, for reproducing the moving picture in realtime by using correlation with the picture frame received in succession.

As described above, the related art moving picture terminal has various disadvantages. First, due to a limitation in a channel bandwidth for realtime transmission of the moving picture, the related art moving picture terminal transmits pictures, not in high quality, but in a low quality when the picture is a moving picture that requires a realtime transmission. Accordingly, it is difficult to transmit a high quality still picture. Further, the transmission of a still picture using a digital camera, a scanner, and a computer requires these additional costly apparatuses that are also inconvenient and cumbersome to use. Thus, a need exists and ceaseless demands have been made for a moving picture terminal that can transmit, not only the moving picture, but also a high quality still picture.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide terminal and method for transporting a still picture that substantially obviates one or more of the problems due to limitations and disadvantages of the related art.

Another object of the present invention is to provide terminal and method for transporting a still picture in which a moving picture terminal is used for transmission of a high quality picture.

To achieve at least the above objects and other advantages in a whole or in part and in accordance with the purpose of the present invention, as embodied and broadly described, a picture terminal includes a first core part for encoding a moving picture or encoding a frame unit still picture extracted from the moving picture in a fixed quantizing value, to forward the still picture in a high resolution, a VLC for encoding data encoded at the first core part in lengths different from each other, a first channel buffer for buffering an encoded bitstream of the moving picture among the data from the VLC, a first bitstream memory for storing an encoded bitstream of the still picture among the data from the VLC in response to a control signal, and a first multiplexer for selecting, and forwarding one from the moving picture from the first channel buffer and the still picture from the first bitstream memory.

To further achieve the above objects in a whole or in part and in accordance with the. present invention, there is provided a picture terminal that includes a demultiplexer for receiving and sorting an encoded still picture or a moving picture bitstream, a second channel buffer for receiving, and storing the moving picture bitstream from the demultiplexer, a second bitstream memory for receiving, and storing a still picture bitstream from the demultiplexer, a second multiplexer for selectively forwarding the moving picture from the second buffer channel or the still picture from the second bitstream memory in response to a control signal, a VLC for subjecting the data from the second multiplexer to VLC, and a second core part for quantizing the data from the VLC, to decode the data into an original picture.

To further achieve the above objects in a whole or in part and in accordance with the present invention, there is provided a picture terminal that includes a frame memory for storing frame unit of still pictures, a core part for encoding the still pictures stored in the frame memory in a fixed quantizing value, a VLC for encoding data encoded at the core part into lengths different from each other, and a channel buffer for buffering, and transmitting the data from the VLC while preventing overflow by providing a control signal to the core part and the VLC for temporary stop of the encoding.

To further achieve the above objects in a whole or in part and in accordance with the present invention, there is provided a picture terminal that includes an encoding frame memory for storing a prior picture frame for motion estimation and compensation, an encoding core part for receiving and encoding a picture frame by using the encoding frame memory, a decoding core part for decoding the picture frame from the encoding core part, a decoding frame memory for storing a prior picture frame for decoding of the decoding core part in a moving picture mode, and storing a still picture frame to be transmitted received from a camera in a still picture mode, a controller for controlling a data flow according to the moving picture mode or the still picture mode to store the still picture to be transmitted received from the camera in the still picture mode to the decoding frame memory, and carry out control for repeated encoding of the still picture frame, a first multiplexer for selecting either one from the moving picture frame received from the camera and the still picture frame stored in the decoding frame memory and forwarding to the decoding core part under the control of the controller, and a second multiplexer for selecting either one from the moving picture frame from the decoding core part and the still picture frame from the camera and forwarding to the decoding frame memory under the control of the controller.

To further achieve the above objects in a whole or in part and in accordance with the present invention, there is provided a method for transporting a still picture that includes (1) extracting frame unit of still pictures form moving pictures, (2) encoding the extracted still picture in a fixed quantizing value and storing the quantized still picture and (3) transmitting the stored still picture in a still picture transmission mode.

To further achieve the above objects in a whole or in part and in accordance with the present invention, there is provided a method for transporting a still picture that includes (1) receiving, and storing frame unit of still pictures, (2) encoding the stored frame unit of still pictures in a fixed quantizing value, (3) stopping the encoding temporarily if an overflow occurs at a channel buffer which transmits the encoded still picture and (4) re-starting the encoding if the channel buffer is stabilized for transmitting the encoded still pictures.

To further achieve the above objects in a whole or in part and in accordance with the present invention, there is provided a method for transporting a still picture that includes (1) receiving, and storing frame unit of still pictures, (2) encoding, and transmitting the stored frame unit of still pictures, (3) encoding the stored frame unit of still pictures repeatedly until the still pictures have a certain resolution and transmitting the still picture.

To further achieve the above objects in a whole or in part and in accordance with the present invention, there is provided a picture terminal that includes a first core part that encodes a moving picture at a first quantizing value corresponding to a first display resolution or encodes a frame unit still picture with a corresponding second higher resolution, a VLC that encodes data encoded at the first core part in lengths different from each other and an output unit that outputs an encoded bitstream of output data of the VLC.

To further achieve the above objects in a whole or in part and in accordance with the present invention, there is provided a method for transporting a still picture that includes extracting one of a frame unit of still pictures and a moving picture, encoding one of the extracted still picture and the moving picture and transmitting the encoded still picture at a higher resolution than the encoded moving picture.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings. The present invention discloses at least four types of terminal and four methods for transporting a still picture when a moving picture terminal is used for transmission of a high quality still picture.

In one preferred still picture transport method, frame units of still pictures are extracted from moving pictures, and subjected to I picture coding to produce a bitstream. The bitstream is preferably stored in an additionally provided bitstream memory, and transmitted toward the receiver side as the user desires. In another preferred still picture transport method, frame units of still pictures are received from a camera, subjected to I picture coding, and transported to the receiver side. In this case, additional control such as a control signal preferably prevents overflow and underflow of channel buffer from occurring. In yet another preferred still picture transport method, the same still picture is coded for plural times for obtaining a high quality picture gradually without using additional control such as addition of the control signal. In still yet another still picture transport method, the still picture that is subjected to I picture coding or that is coded plural times to gradually obtain a high quality picture can be stored in a frame memory in the decoding part for encoding the still picture.

Figure 4:
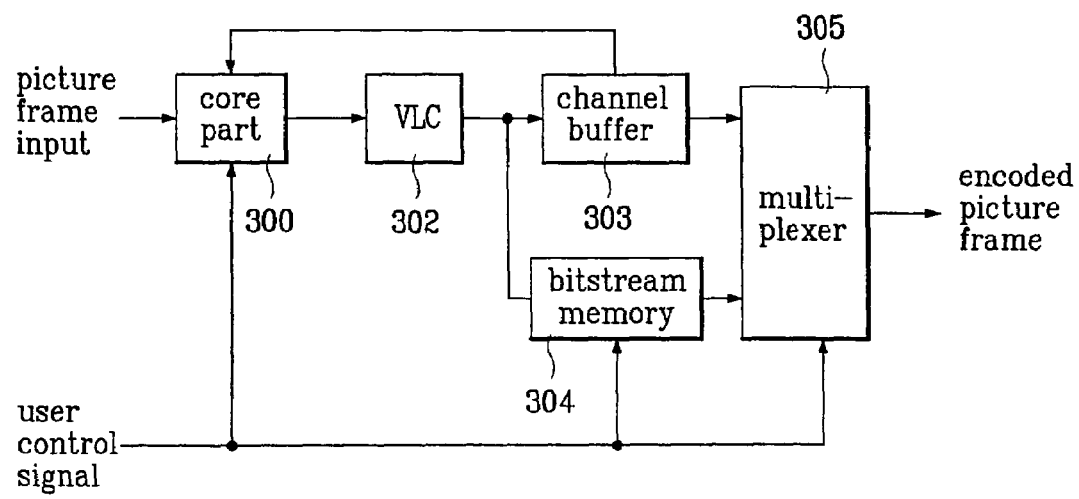
FIG. 4 illustrates a block diagram showing an encoder in a moving picture terminal in accordance with one preferred embodiment of the present invention.
Figure 5:
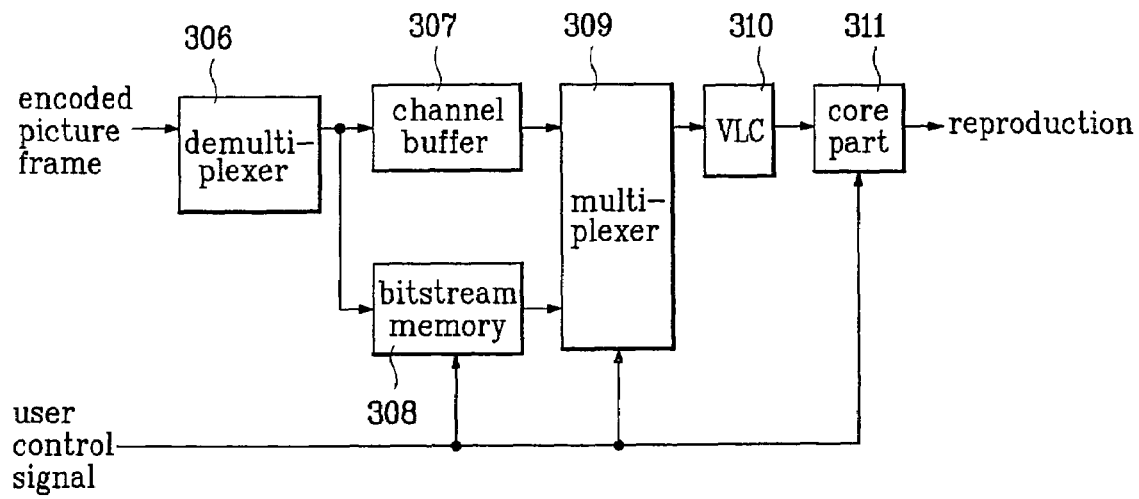
FIG. 5 illustrates a block diagram showing a decoder in a moving picture terminal in accordance with one preferred embodiment of the present invention.

In a first preferred embodiment of a still picture transport method, frame units of still pictures are extracted from incoming moving pictures, subjected to encoding, and transported. However, a bitstream generated in the encoding of the still pictures is stored, not in the channel buffer, but preferably in an additional bitstream memory that is for transmission of the stored bitstream at a time point the user selects. To accomplish the later transmission of the still picture, the encoder and decoder in the moving picture terminal in accordance with the first preferred embodiment of the present invention preferably has a bitstream memory and a multiplexer for processing the still pictures. FIG. 4 illustrates a block diagram showing an encoder in a moving picture terminal in accordance with the first preferred embodiment of the present invention, and FIG. 5 illustrates a block diagram showing a decoder in a moving picture terminal in accordance with a first preferred embodiment of the present invention.

As shown in FIG. 4, the encoder in a moving picture terminal in the first preferred embodiment includes a core part 300 having a quantizer (not shown), an inverse quantizer (not shown), and a frame memory either for receiving, compressing, and encoding successive moving pictures to forward the moving picture in a low quality, or for receiving the successive moving pictures, extracting frame units of still pictures from the moving pictures and encoding the extracted still picture frames to forward the still pictures in a high quality. The quality of the still picture can depend on a user selected quantizing value. A VLC 302 is for encoding encoded symbols of the moving picture or still picture at the core part 300 in lengths different from each other depending on frequencies of occurrence, and a channel buffer 303 is for buffering an encoded bitstream of the moving picture among data from the VLC 302. A bitstream memory 304 stores an encoded bitstream of the still picture among data from the VLC 302 in response to the user control signal, and a multiplexer 305 transmits either one of the moving picture bitstream or the still picture bitstream according to selection of the user. As described above, the bitstream memory 304 and the multiplexer 305 are additional parts relative to the related art encoder.

The bitstream memory 304 and the multiplexer 305 are added because in general, a picture quality of the still picture should be higher than the moving picture due to difference of use. That is, though only one picture is transported, the still picture should be a high quality picture that gives no difference of feeling from an original picture. Accordingly, the high quality still picture is preferably compressed into many bits at the encoder because the high quality still picture is encoded into a high bit ratio (i.e., a low compression ratio), which requires an additional memory. The bitstream memory 304 in the first preferred embodiment is the very memory for storing such bits.

The encoder of the first preferred embodiment would be simpler if the still picture could be stored in the channel buffer 303, which has a size restriction caused by a limitation of delay in transmission of the moving picture. That is, as a delay of moving picture in a range of 300 msec is in general permitted from a transmission side camera to a receiver side display. If a time period for passing the channel buffer 303 of a moving picture bitstream is set to be 100 msec, a size of the channel buffer 303 is 64 kbit determined from 100 msec×64 kbps considering a moving picture transmission rate of 64 kbps. If it is assumed that a still picture of a Common Interchange Format (CIF) form (i.e., 352×288) is transmitted, with the still picture compressed into 2 bits/pixel, bits in a range of 300 Kbits are produced when one picture is compressed (e.g., 352×288×1.5×2, where 1.5 means that a size of total picture is 1.5 times a size of a luminance picture for a 4:2:0 format). Thus, the channel buffer 303 of a 64 Kbit size can not store all the bitstream of 300 Kbit produced in compression of the still picture. Due to this reason, the encoder in the first preferred embodiment includes a separate bitstream memory 304 for storing bits produced when the still picture is encoded in addition to the channel buffer 303.

A first preferred embodiment of a method for transporting a still picture by using an encoder in a moving picture terminal in accordance with the present invention will now be described. The first preferred embodiment of a method for transporting a still picture can be used, for example, with the first embodiment of a moving picture terminal. Operations for transporting a moving picture are omitted here as the first preferred method is similar to the related art method. Different from transmission of the moving picture, in transmission of the still picture according to the first preferred embodiment, the user preferably maintains a fixed low quantizing value for an extracted still picture to maintain a high bit rate. When the moving picture is encoded, the quantizing value may vary with the channel buffer 303 state, however, in a case of encoding the still picture, the user maintains a fixed quantizing value lower than the case of the moving picture encoding. Preferably the core part 300 encodes the moving picture in I picture coding that uses only a first picture frame of the moving picture. Then, according to the low quantizing value, the core part 300 produces an amount of data having a large quantity of information in encoding the still picture to cause the VLC 302 to produce a large quantity of bits, and the bitstream is stored in the bitstream memory 304. The channel buffer 303 is used only in encoding the moving picture. At a user desired time point, a user control signal is generated to transmit the encoded bitstream of the still picture stored in the bitstream memory 304 in a preset channel transmission rate.

In the first preferred embodiment of a method for transmitting a still picture using the first preferred embodiment of the moving picture terminal encoder, the user control signal is provided to the core part 300, the bitstream memory 304, and the multiplexer 305 when the still picture is transmitted. For example, if the transmission rate is 64 kbps, and an amount of bits for one picture is approximately 300 kbits, approximately 5 seconds are required for transmission of one still picture. Since such a transmission time period is reduced as the transmission rate becomes the higher, or the picture quality is reduced as the transmission rate becomes higher, the user may find a point of an appropriate compromise considering a time period of transmission of the picture. That is, the quantizing value is preferably regulated with reference to the transmission time period.

A decoder in the moving picture terminal in accordance with a first preferred embodiment of the present invention will now be described, which restores a still picture encoded into a high resolution and transmitted from an encoder.

As shown in FIG. 5, the decoder in accordance with a first preferred embodiment of the present invention includes a demultiplexer 306 for receiving a bitstream of still pictures or moving pictures and sorting the bitstream, a channel buffer 307 for receiving and storing the bitstream of the moving picture from the demultiplexer 306 and a bitstream memory 308 for receiving and storing the bitstream of the still picture from the demultiplexer 306. A multiplexer 309 is for forwarding the bitstream of the moving picture or the still picture from the channel buffer 307 or the bitstream memory 308 in response to a user selection signal. A VLC 310 is for subjecting the data from the multiplexer 309 to VLC, and a core part 311 for subjecting the data from the VLC 310 to an inverse quantizing to decode into an original picture. In the decoder according to the first preferred embodiment, although the core part 311 has a great inverse quantizing value in decoding the moving picture, the core part 311 has a relatively small inverse quantizing value in decoding the still picture because the still picture is encoded into a higher resolution picture at the encoder. The decoder stores the bitstream of the encoded still picture transmitted from the encoder, and decodes the stored bitstream at a desired time point to reproduce the still picture. To do this, similar to the encoder, the user control signal is provided to the bitstream memory 308 and the multiplexer 309.

As described above, since a compressed bitstream of a still picture is stored in the bitstream memory 308 in the method for transporting a still picture in accordance with a first preferred embodiment of the present invention, a moving picture terminal may be used in place of a digital camera if a large sized bitstream memory 308 is provided for storage of many sheets or frames of still picture.

Figure 6:
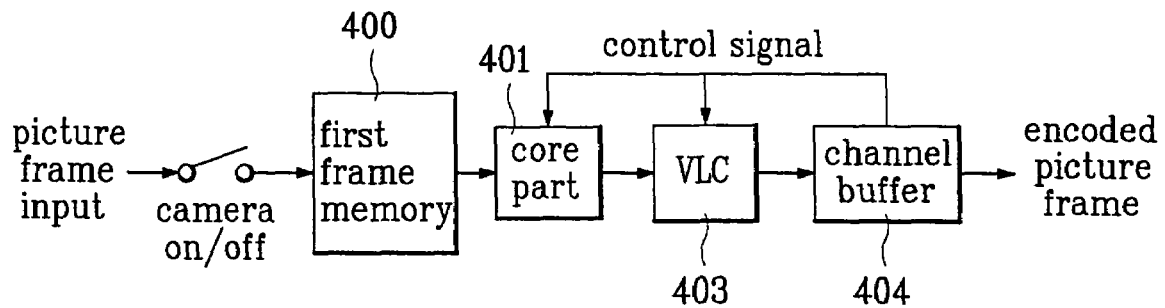
FIG. 6 illustrates a block diagram showing an encoder in a moving picture terminal in accordance with another preferred embodiment of the present invention.
Figure 7:
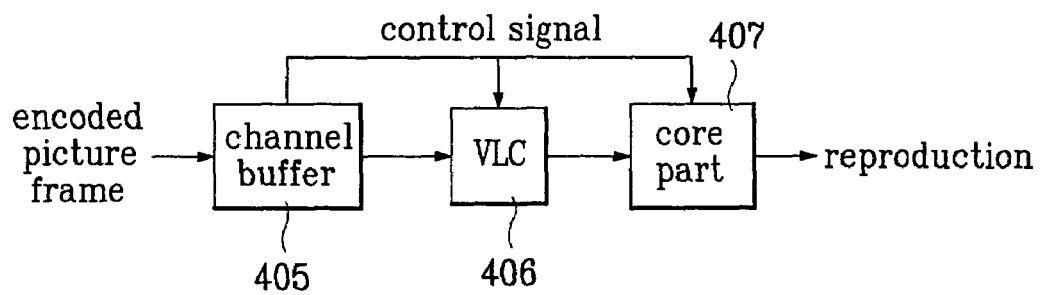
FIG. 7 illustrates a block diagram showing a decoder in a moving picture terminal in accordance with another preferred embodiment of the present invention.

FIG. 6 illustrates a block diagram showing an encoder in a moving picture terminal in accordance with a second preferred embodiment of the present invention, and FIG. 7 illustrates a block diagram showing a decoder in a moving picture terminal in accordance with the second preferred embodiment of the present invention. A preferred embodiment of a method for transporting a still picture in accordance with a second preferred embodiment of the present invention receives frame units of still pictures preferably from a camera or the like, and encodes the still pictures for transmission. In order to carry out such a still picture transmission, a separate frame memory 400 is provided in front of a core part 401 similar to the related art encoder core part shown in FIG. 2. The frame memory 400 stores the frame units of still pictures, and a control signal for controlling operation of the core part 401 and the VLC 403 is additionally generated at the channel buffer 404. Though not shown in FIG. 6, the core part 401 has a frame memory (see e.g., FIG. 2) for estimating and compensating a motion, and there is a separate frame memory 400 in front of the core part 401 in the second preferred embodiment of the present invention.

Operations of the encoder in accordance with a second preferred embodiment of the present invention will now be described. As shown in FIG. 6, frame units of still pictures are received from a camera, and stored in an additional frame memory 400. Although the present invention is not intended to be so limited. Still pictures could be imported from any appropriate device preferably transmitting in a frame unit. Input from the camera may be turned on/off when receiving the frame units of the still pictures. Accordingly, one sheet of still picture frame is preferably stored in the first frame memory 400 in every turn on/off of the camera. Then, the core part 401 subjects the picture stored in the frame memory 400 to I picture coding in a fixed quantizing value as described in the first preferred embodiment. In this instance, since the quantizing value is maintained low, the picture produces many bits in encoding the picture, which may cause an overflow from the channel buffer 404. In order to prevent such an overflow, the channel buffer 404 provides a control signal (e.g., Wait signal) to the core part 401 and the VLC 403 for temporarily stopping the encoding. Accordingly, the core part 401 temporarily stops encoding of the still picture frame stored in the frame memory 400. When a state of the channel buffer 404 is stabilized, the core part 401 restarts the encoding again to again encode the still picture frames stored in the frame memory 400. Thus, since the encoder in accordance with a second preferred embodiment of the moving picture terminal of the present invention encodes the still picture frames stored in the added frame memory 400 with the encoding regulated according to a state of the channel buffer 404, high quality still pictures can be transmitted.

A decoder in accordance with the second preferred embodiment of the present invention will now be described. As shown in FIG. 7, the decoder in accordance with a second preferred embodiment of the present invention has a system similar to the related art decoder shown in FIG. 2. Operations of the decoder of the second preferred embodiment will now be described. The bitstream of the still picture encoded at and provided from the encoder is stored in the channel buffer 405. At the same time, the core part 407 starts decoding the bitstream stored in the channel buffer 405. Since the core part 407 has a decoding rate faster than the channel transmission rate, the channel buffer 405 may be involved in underflow. In order to prevent this, the channel buffer 405 preferably provides a control signal (e.g., a Wait signal) to the core part 407 and the VLC 406 for temporarily stopping the decoding. When the bitstream of the still picture encoded more than a preset reference value is again provided to the channel buffer 405, the VLC 406 and the core part 407 start decoding again to reproduce the still picture.

The decoder in accordance with a second preferred embodiment of the present invention uses no bitstream memory. However, the second preferred embodiment decoder can be used, with an encoder in accordance with the first preferred embodiment.

Figure 8:
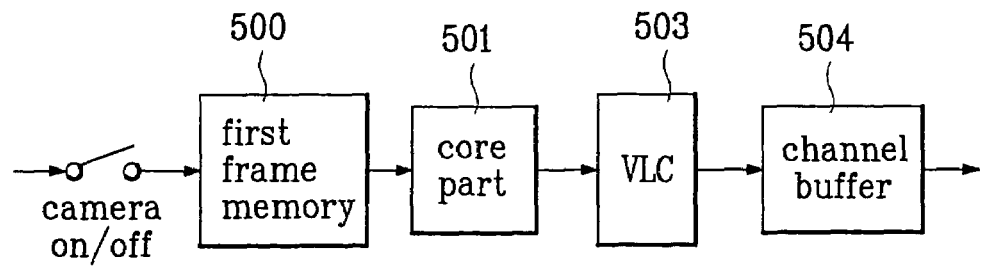
FIG. 8 illustrates a block diagram showing an encoder in a moving picture terminal in accordance with yet another preferred embodiment of the present invention.

FIG. 8 illustrates a block diagram showing an encoder in a moving picture terminal in accordance with a third preferred embodiment of the present invention. A preferred embodiment of a method for transporting a still picture in accordance with the third embodiment of the present invention receives frame units of still pictures from a camera or the like, and subjects them to repeated encoding and transmission to enhance a resolution of the still picture. The encoder in accordance with a third preferred embodiment of the present invention has a system of the encoder of the second embodiment except that the channel buffer in the third preferred embodiment is not required to generate the control signal (i.e., a Wait signal).

As shown in FIG. 8, the still pictures received from the camera in frame units are stored in an added frame memory 500, and a camera input or the like is turned off to stop transmission of the picture. Accordingly, the frame memory 500 stores one sheet of still picture frame every time the camera turned on/off. Then, a core part 501 and a VLC 503 encodes the still picture frames stored in the frame memory 500. In this instance, different from the first or second preferred embodiments according to the present invention, the method for transporting a still picture in accordance with a third preferred embodiment of the present invention does not fix the quantizing value for one frame of still picture, but varies the quantizing value with a state of the channel buffer 504 in encoding the still picture frame.

Figure 1:
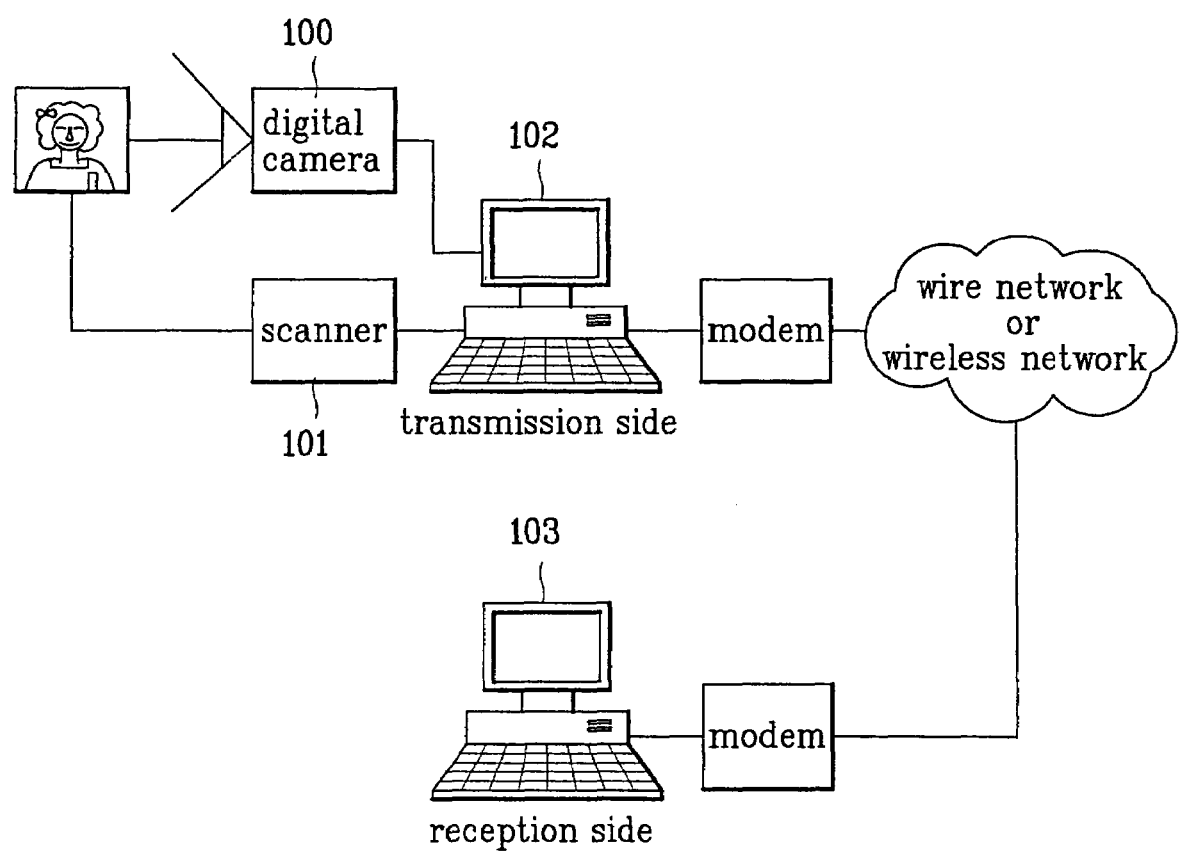
FIG. 1 illustrates a related art system for transmitting a still picture.
Figure 2:
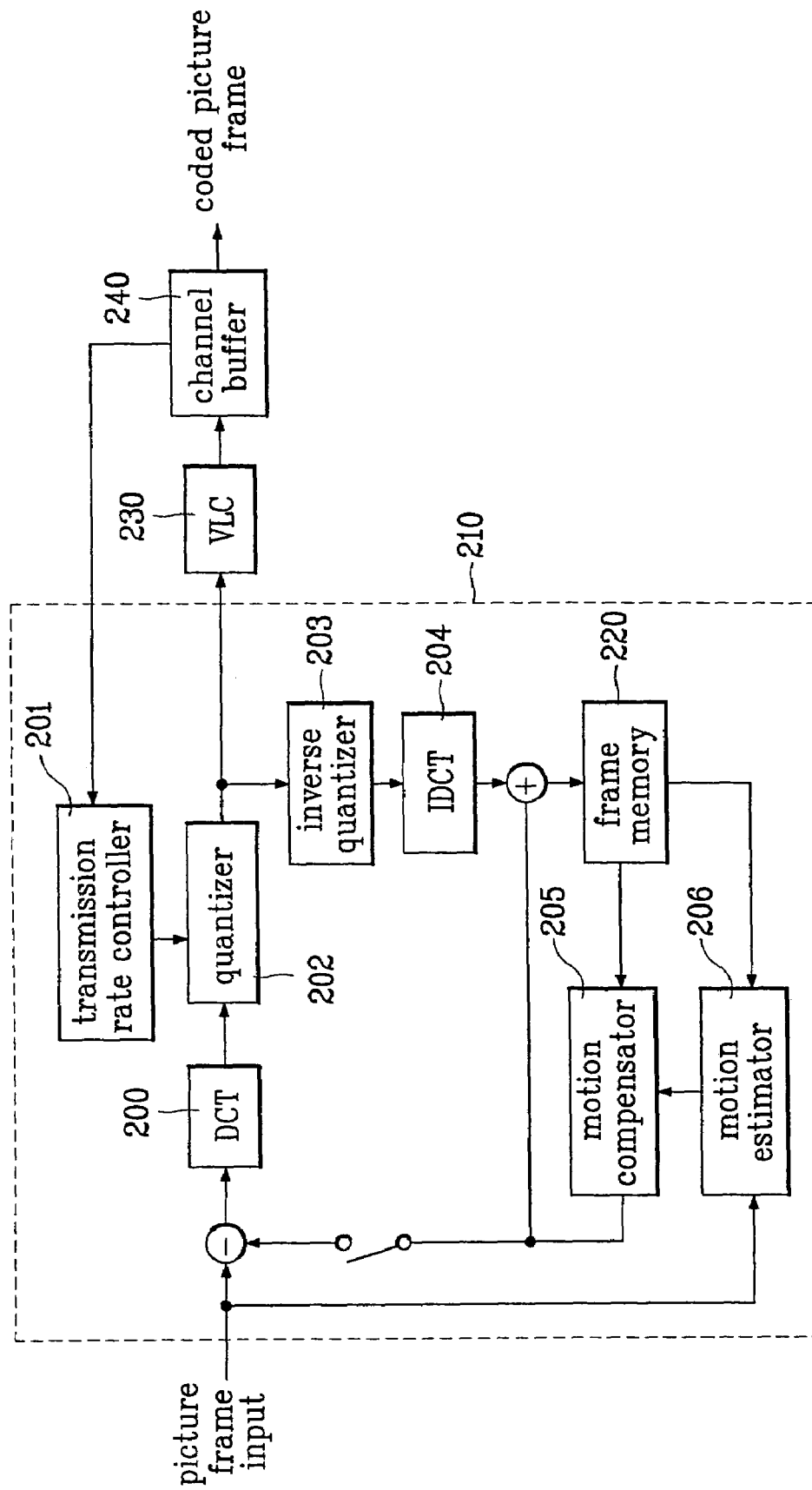
FIG. 2 illustrates a block diagram showing an encoder in the related art moving picture terminal.
Figure 3:
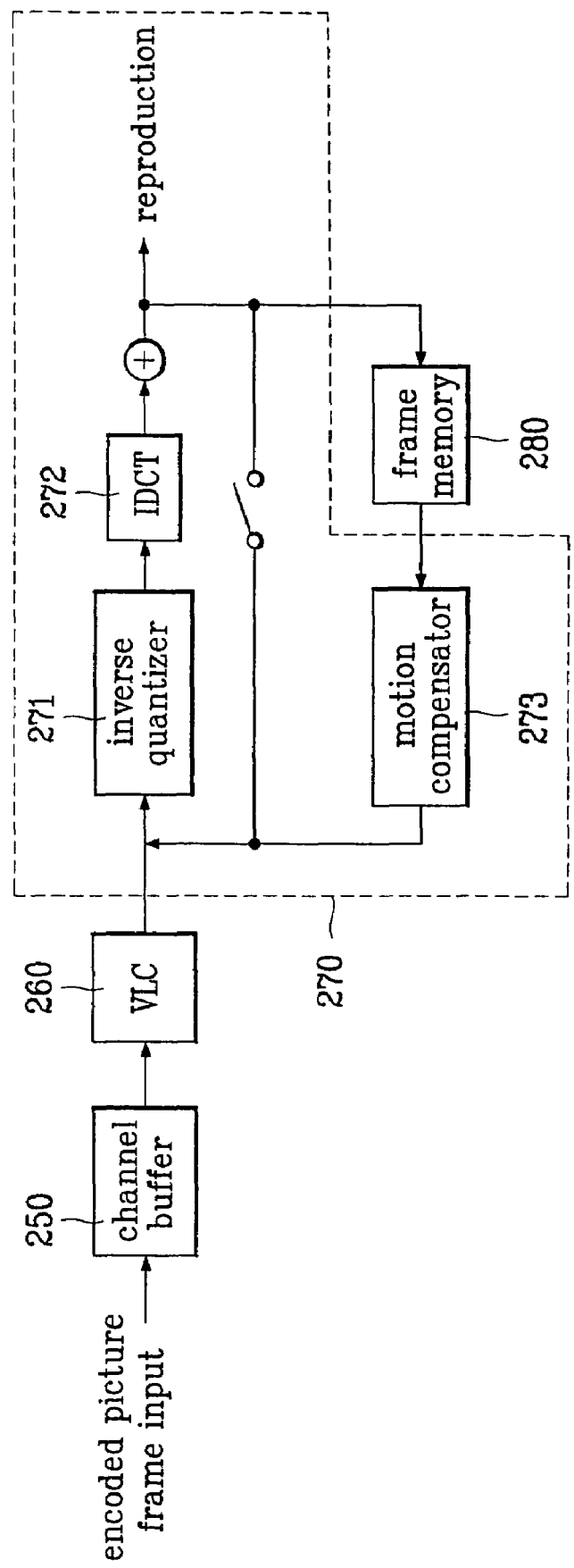
FIG. 3 illustrates a block diagram showing a decoder in the related art moving picture terminal.

This variable quantizing operation is similar to the operation of an encoder for a moving picture that encodes the pictures stored in the frame memory 500 and transmits to the receiver side the same as when the related art moving pictures are processed. There, the related art decoder having a system identical to the system of the decoder as shown in FIG. 2 restores and reproduces low quality still pictures.

In the third preferred embodiment, however, when the moving picture is processed, picture frames provided to the encoder in succession are processed. However, as the camera input is turned off to receive no new still picture, the frame memory 500 stores the still picture identical to the still picture encoded and transmitted, and thus, the still picture is encoded and transmitted again. The core part 501 has a frame memory 502 for making an motion estimation and compensation, and the frame memory 502 in the core part 501 has the picture frame (i.e., the picture frame processed for the first time since pictures are provided from the camera) encoded previously, and stored therein. Now, since the frame memory 500 provides the same still picture again, to produce less amount of bits than the picture frame processed previously (i.e., the picture frame. processed for the first time since pictures are provided from the camera), if a difference of the provided picture frame and the picture frame stored in the frame memory 502 in the core part 501 is encoded and forwarded, the channel buffer 504 lowers the quantizing value in the controlling the transmission rate. Accordingly, the decoder side can reproduce a picture having the picture quality increased for the same still picture. Operations of repeated transmission of one still picture from the encoder of the third preferred embodiment are preferably stopped at a preset reference value.

The reference value, which may be set by the user or the encoder, can be set, for example, in the following two ways. First, a preset time for the encoder to repeatedly transmit the still picture is fixed. Second, the preset time is varied with an amount of occupation of the channel buffer. The repeated transmission is stopped at a time point when the occupation of the channel buffer becomes below a certain value. Upon repeated transmission of the one still picture described above, a desired high quality still picture can be transported in accordance with a third preferred embodiment of the present invention.

A moving picture terminal has an encoder and a decoder together with both of them operative at the same time as the moving picture transmission is bidirectional. However, the transmission and reception of a still picture is likely one directional. In such a case, only the encoder is operative in a moving terminal transmitting the still picture, and only the decoder is operative in a moving terminal receiving the still picture. Accordingly, in a moving picture terminal that employs the preferred embodiments of the still picture transmission method as the first, second or third preferred embodiments of the present invention, the motion compensation memory in the decoder may be used in place of the bitstream memory or input picture frame memory during transmission (e.g., in an encoder), and the motion compensation frame memory in the encoder may be used in place of the bitstream memory during reception (e.g., in a decoder).

Figure 9:
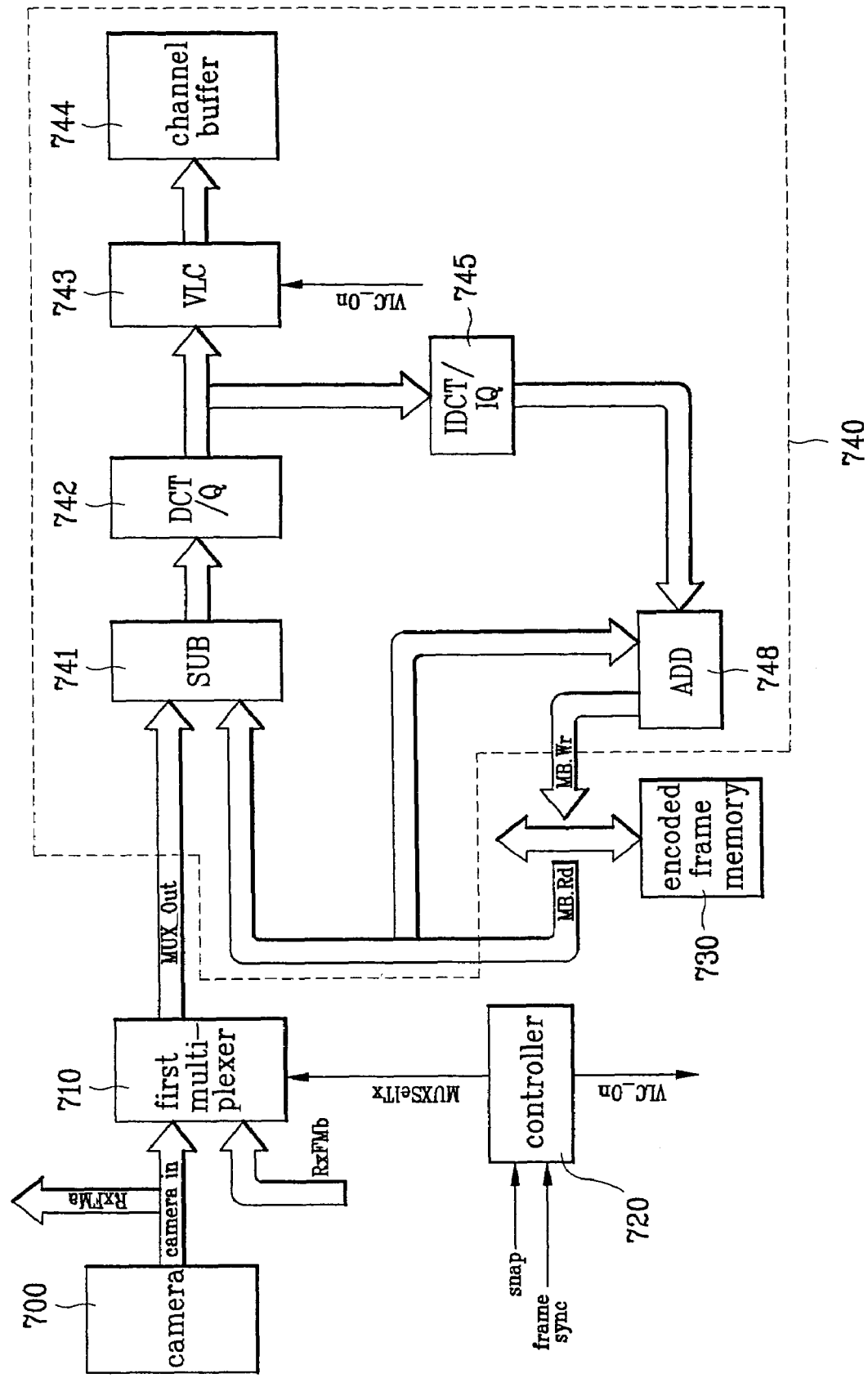
FIG. 9 illustrates a block diagram showing an encoder in a moving picture terminal in accordance with still yet another preferred embodiment of the present invention.
Figure 10:
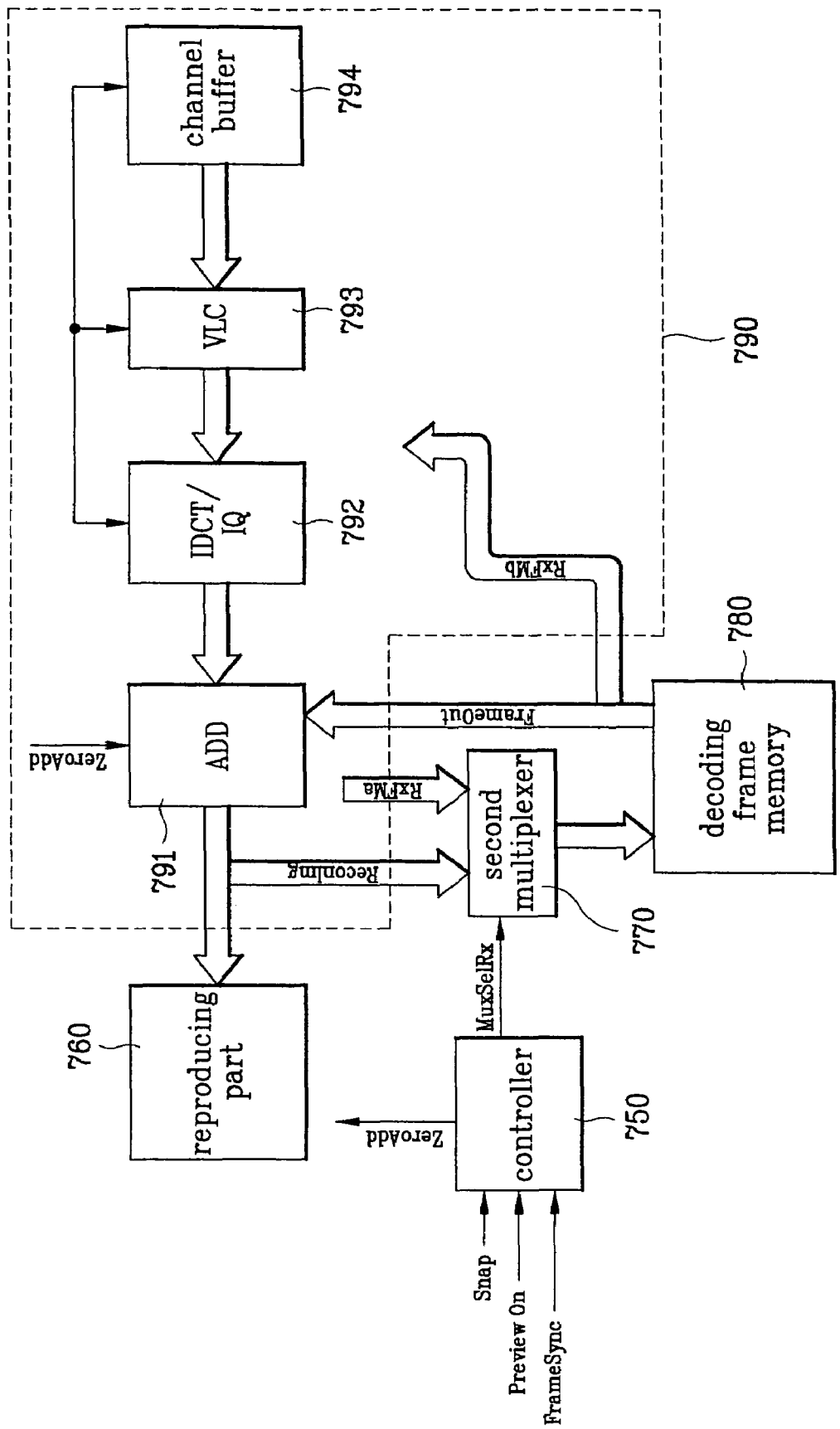
FIG. 10 illustrates a block diagram showing a decoder in a moving picture terminal in accordance with still yet another preferred embodiment of the present invention.
Figure 11:
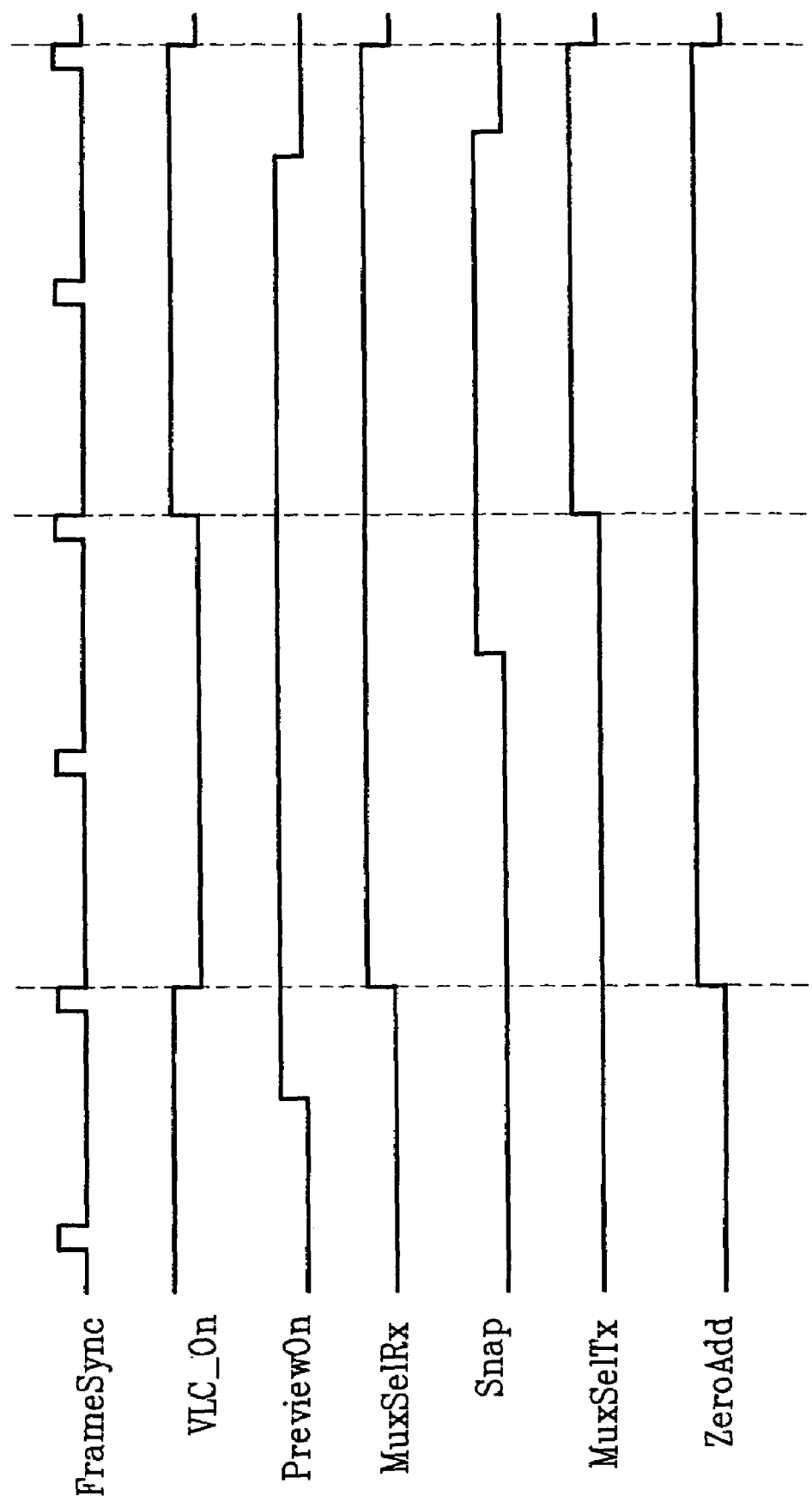
FIG. 11 illustrates an operation timing diagram of respective parts in accordance with still yet another preferred embodiment of the present invention.

FIG. 9 illustrates a block diagram showing an encoder in a moving picture terminal in accordance with a fourth preferred embodiment of the present invention, FIG. 10 illustrates a block diagram showing a decoder in a moving picture terminal in accordance with a fourth preferred embodiment of the present invention. FIG. 11 illustrates an operation timing diagram of respective parts in accordance with a fourth preferred embodiment of the present invention.

In the fourth preferred embodiment of the present invention, the timings in FIGS. 6 or 8 for example, would be adjusted appropriately to use the frame memory in the decoder. That is, since a picture taken by its own camera is displayed on its display in a still picture transmission mode, decoding of the moving picture received from an opposite party is not required. Accordingly, by appropriate timing adjustment and data flow control, the frame memory in the decoder of the transmission side can preferably be used as a still picture frame memory added to the encoder.

As shown in FIGS. 9 and 10, the picture terminal in accordance with a fourth preferred embodiment of the present invention includes an encoding frame memory 730 for storing a prior picture frame for motion estimation and compensation, an encoding core part 740 for receiving and encoding a picture frame after being motion estimated and compensated by using the encoding frame memory 730, a decoding core part 790 for decoding a bitstream from the encoding core part 740 and a decoding frame memory 780 for storing a prior picture frame for decoding of the decoding core part 790 in a moving picture mode. The decoding frame memory 780 also stores a still picture frame to be transmitted received from the camera in a still picture mode. A controller 720 or 750 is for controlling a data flow according to the moving picture mode or the still picture mode to store the still picture to be transmitted received from the camera in the still picture mode to the decoding frame memory 780, and carry out control for repeated encoding of the still picture frame. A first multiplexer 710 selects either one from the moving picture frame received from the camera and the still picture frame stored in the decoding frame memory 780 for forwarding to the decoding core part 740 under the control of the controller 720 or 750. A second multiplexer 770 is for selecting either one from the moving picture frame from the decoding core part 790 and the still picture frame from the camera and forwarding to the decoding frame memory 780 under the control of the controller 720 and 750. A reproducing part 760 displays a picture data from the decoding core part 790. The controller 720 or 750 in the encoder or the decoder may be one or two depending on functions of the encoder and decoder.

Operations of the fourth preferred embodiment of the picture terminal will now be described. There may be a preview mode and a snap mode for the convenience of the user in a still picture taking operation by a picture terminal according to the present invention. In order to transmit the still picture, after proceeding from the moving picture mode to the preview mode, the still picture is transmitted by using the still picture transporting method according to the present invention in the snap mode. In the moving picture mode, the terminal's own moving picture is transmitted, and the moving picture from an opposite party is displayed on its own reproducing part 760. In the preview mode, the terminal's own moving picture is displayed on its own reproducing part 760, and its own moving picture may or may not be transmitted to the opposite party. In the snap mode, the picture selected by the terminal itself is preferably captured, and a still picture in which the picture quality is gradually improved is displayed on the reproducing part 760 and also transmitted to the opposite party.

The preview mode is a mode in which an object is shown to the user before the still picture is encoded and transmitted. Thus, the user generates a snap signal for capturing the still picture once a desired still picture is displayed. According to the snap signal, the picture terminal proceeds into the snap mode which encodes and transmits the captured still picture. The control signals for taking the still picture at the encoder/decoder are mostly directed to the multiplexers 710 and 770. Since one directional communication is made in transmission of the still picture, the motion compensation frame memory 780 in the decoder is not used for decoding, and the motion compensation frame memory 780 can be exclusively used as the still picture storage frame memory. Accordingly, the encoder in FIG. 10 is used as the motion compensation frame memory 780 of the decoder for transmission of the still picture. In this instance, the control signals in the encoder is preferably operative according to the timing shown in FIG. 12.

Operations of the encoder according to the fourth preferred embodiment will now be described. The user can set the preview mode for examining the object before capturing a still picture, which is provided to the controller 750 in the decoder as a PreviewOn signal. The PreviewOn signal is generated at any time according to a selection of the user. However, since the encoder is always operative according to a FrameSync signal that identifies the beginning of one frame, the encoder is not responsive to the PreviewOn signal even if the PreviewOn signal is received at an arbitrary time. That is, a MuxSelRx signal required for the preview mode is generated matched to the FrameSync. In the moving picture mode, the first multiplexer 710 forwards a signal from the camera or the like 700 to the encoder and closes a RxFMb under the control of the controller 720. In this instance, the second multiplexer 770 closes RxFMa and opens ReconImg signal, for permitting the decoding frame memory 780 to be used for moving picture decoding.

However, when the PreviewOn is set up, at a first succeeding FrameSync, the controller 750 generates MuxSelRx signal for transmitting the still picture frame received through the camera 700 to the second multiplexer 770 through RxFMa. The second multiplexer 770 forwards and stores the still picture frame in the motion compensation frame memory 780 in the decoder. That is, the still picture frame from the camera 700 is transmitted to the second multiplexer 770 in the decoder and stored in the frame memory 780 in the decoder. In such a preview mode, the first multiplexer 710 closes a Camera In signal and the RxFMb signal, the controller 720 turns off a VLC_On signal provided to the VLC 743 for stopping moving picture encoding, and the controller 750 in the decoder generates a ZeroADD signal to an ADD 791 for cutting off the moving picture frames provided from the IDCT/IQ 792. Then, the still picture data stored in the frame memory 780 in the decoder is transmitted to the reproducing part 760 through the ADD 791, and the reproducing part 760 displays the object the user desires to capture. In this instance, the receiver side picture terminal stops a decoding operation in response to an EOS (End of Sequence) added to the data transmitted as the VLC_On is turned off, and displays the last picture, continuously. As an alternative, the first multiplexer 710 may open the Camera In signal or RxFMb signal and transmit the picture the user has taken. When the preview mode comes, the picture terminal stores the still picture frame RxFMa received through the camera 700 in the motion compensation frame memory in the decoder, and the stored still picture frame is displayed on the reproducing part 760 through the FrameOut.

When a desired still picture is displayed, the user presses a button for protecting the displayed still picture and to provide a snap signal to the controller 720 end 750. In this instance, even if the snap signal is provided at an arbitrary time, the encoder and the decoder are operative synchronous to the FrameSync signal. Accordingly, at a first FrameSync after snap signal, the controller 720 provides a MuxSelTx signal to the first multiplexer 710, to cut off a CameraIn signal from the camera, and to provide the still picture frame RxFMb signal stored in the motion compensation frame memory 780 in the decoder to the encoder through the first multiplexer 710. In this instance, the controller 720 turns on the VLC_On signal provided to the VLC 743 for encoding the still picture frame from the first multiplexer 710. And, the controller 720 either closes the second multiplexer 770 with respect to the RxFMa and the ReconImg, or cuts off a writing signal for the memory itself, for preventing the still picture frame from the camera 700 from being provided to the motion compensation frame memory 780 in the decoder, no more. The ZeroAdd is maintained, and the VLC_On is at a turned on state, and the user transmits the picture the user taken to an opposite party.

Accordingly, the encoder either encodes the one still picture frame stored in the motion compensation frame memory 780 in the decoder by providing the wait signal the same as the second preferred embodiment of the present invention, or encodes repeatedly and transmits the same as the third preferred embodiment of the present invention until the still picture reaches to a desired picture quality level after a preset time period when all the control signals are initialized, to finish the snap mode. Thus, the picture terminal according to the fourth preferred embodiment of the present invention has a preview mode in change over from the moving picture mode to the still picture mode, so that the user can monitor the object through the reproducing part until a picture the user desires is shown.

Figure 12:
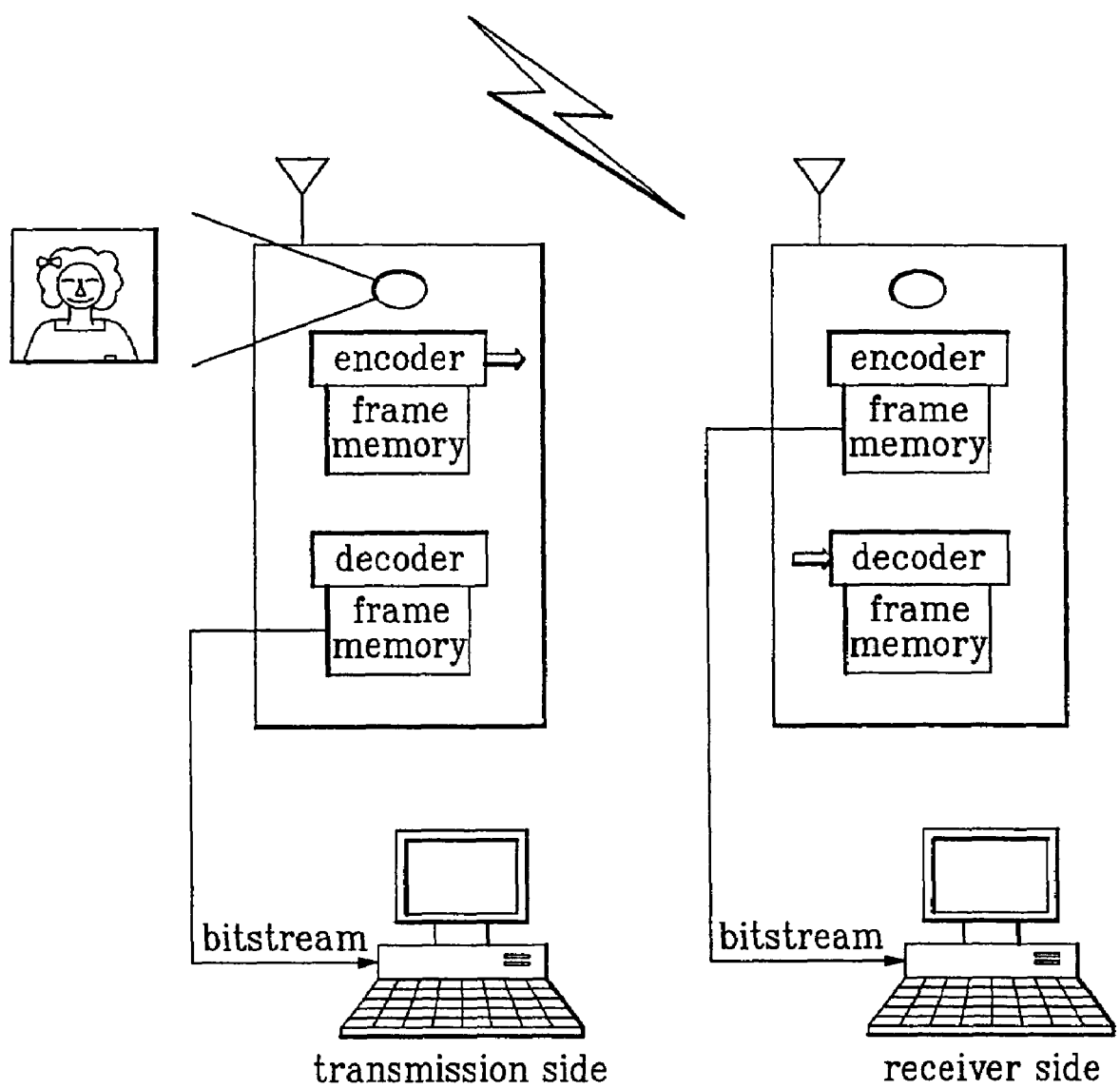
FIG. 12 illustrates a block diagram showing a still picture transmission between moving picture terminals and storing system which employs a method for transporting a still picture in accordance with another preferred embodiment of the present invention.

A still picture transmission and storage system between the moving picture terminals having, for example, the methods for transporting a still picture applied thereto will now be described. FIG. 12 illustrates a block diagram showing a still picture transmission between moving picture terminals and storing system that can employ a method for transporting a still picture in accordance with a first preferred embodiment of the present invention.

As shown in FIG. 12, when the still picture is stored in a computer according to the first preferred embodiment, the still picture is preferably stored in a bitstream. However, since the bitstream of the still picture stored in the computer consists of syntax (i.e., MPEG, H263) for encoding a moving picture, the bitstream of the still picture should be converted into syntax (i.e., JPEG) of the still picture. In order to carry out this function, the computer should be provided with a transcoder software for converting syntax.

Figure 13:
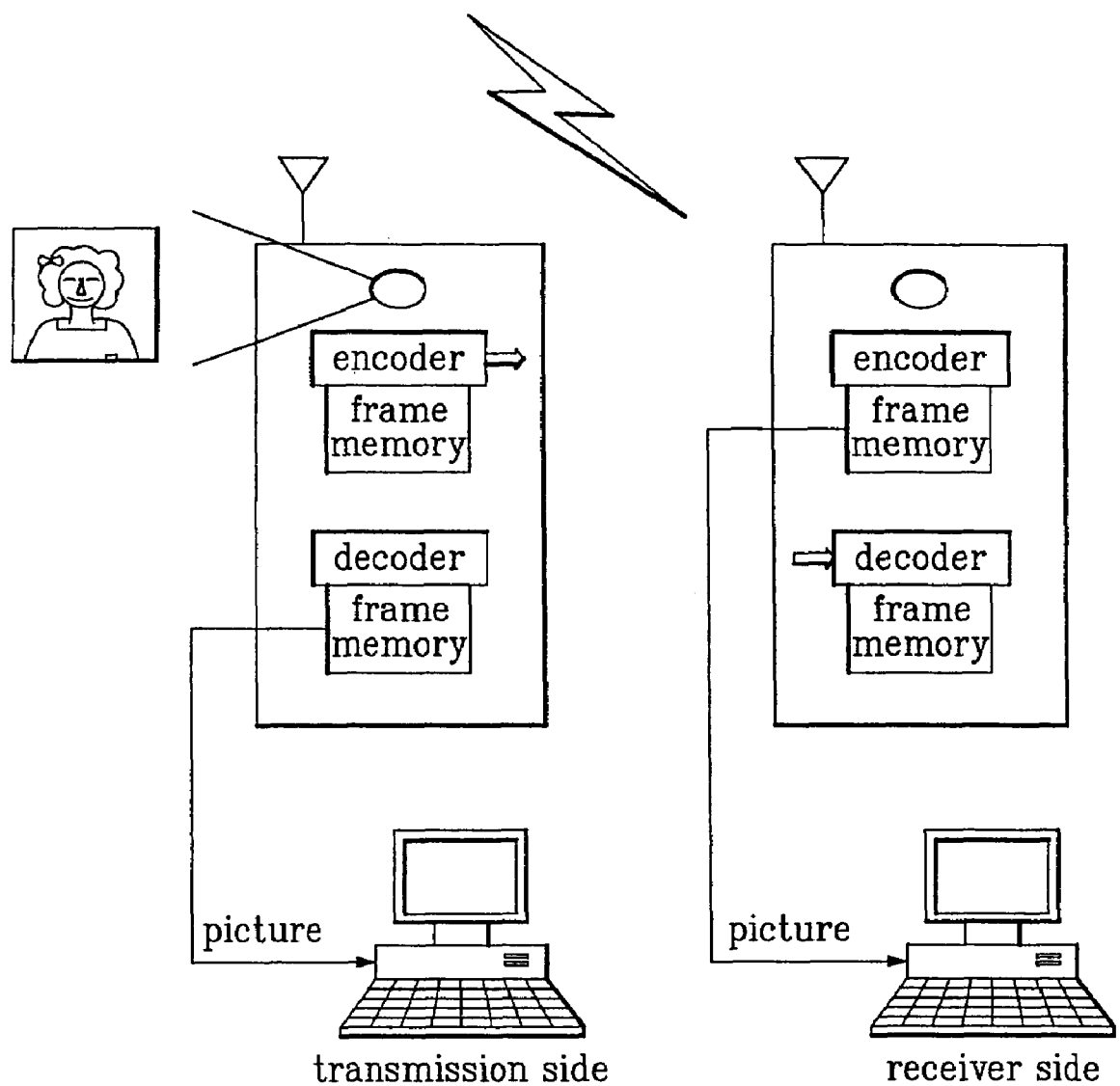
FIG. 13 illustrates a block diagram showing a still picture transmission between moving picture terminals and storing system which employs a method for transporting a still picture in accordance with preferred embodiments of the present invention.

FIG. 13 illustrates a block diagram showing a still picture transmission between moving picture terminals and storing system that can employ a method for transporting a still picture in accordance with a second, third, or fourth preferred embodiments according to the present invention. As shown in FIG. 13, in the second, third, or fourth preferred embodiments, picture data is stored even if data is stored in the computer.

As described above, a terminal and method for transporting a still picture according to preferred embodiments of the present invention have various advantages. The preferred embodiments of a terminal and method for transporting a still picture according to the present invention can save a cost for transporting a still picture because the picture terminal is permitted to transmit the still picture in a high resolution even without a digital camera, scanner and computer. Further, transmission/reception of a desired still picture regardless of the time and place by using a moving picture terminal enhances use of the picture terminal. By enlarging a size of a bitstream memory in the first embodiment of the present invention, and adding a large sized memory to a rear end of the VLC in the second, third, or fourth preferred embodiments to store many still pictures before transmission through a channel, the moving picture terminal can be used in place of a digital camera. In addition, transmission of a high quality still picture by using a frame memory in a decoder already present without addition of any new hardware permits an easy implementation of the picture terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communication terminal, comprising:
a wireless communication unit configured communicate with a second mobile communication terminal, the wireless communication unit transmitting a first moving picture data to the second mobile communication terminal while receiving a second moving picture data fro the second mobile communication terminal; and
a processor configured to receive a first signal for transmitting a still picture data when the wireless communication unit communicates with the second mobile communication terminal, wherein the wireless communication unit transmits the still picture data instead of the first moving picture data to the second mobile communication terminal when the processor receives the first signal.

2. The mobile communication terminal of claim 1, further comprising:
a display configured to display the second moving picture data while the wireless communication unit receives the second moving picture data.

3. The mobile communication terminal of claim 2, wherein the processor receives a second signal and the still picture data is selected based on the second signal.

4. The mobile communication terminal of claim 3, wherein the first moving picture data includes a plurality of still pictures data and the still picture data selected from the first moving picture data.

5. The mobile communication terminal of claim 4, wherein the processor receives the second signal while the wireless communication terminal transmits the first moving picture data to the second mobile communication terminal.

6. The mobile communication terminal of claim 5, wherein the display displays the still picture data while the wireless communication unit transmits the still picture data to the second mobile communication terminal.

7. The mobile communication terminal of claim 6, further comprising:
a camera configured to capture an image data, wherein the first moving picture data is based on the image data.

8. A method for transporting a still picture using a mobile communication terminal, the method comprising:
transmitting a first moving picture data to a second mobile communication terminal while receiving a second moving picture data from the second mobile communication terminal;
receiving a first signal for transmitting a still picture data while transmitting the first moving picture data to the second mobile communication terminal; and
transmitting the still picture data to the second mobile communication terminal according to the first signal.

9. The method of claim 8, further comprising:
displaying the second moving picture data while receiving the second moving picture data.

10. The method of claim 9, further comprising:
receiving a second signal for selecting a still picture data.

11. The method of claim 10, wherein the first moving picture data includes a plurality of still pictures data and the still picture is selected from the first moving picture.

12. The method of claim 11, wherein the second signal is received while transmitting the first moving picture data to the second mobile communication terminal.

13. The method of claim 12, further comprising:
displaying the still picture data while transmitting the still picture data.

14. The method of claim 13, further comprising:
capturing an image data, wherein the first moving picture data is based on the image data.

15. A mobile communication terminal, comprising:
a camera configured to capture an image data;
a wireless communication unit configured to communicate with a second mobile communication unit, the wireless communication unit transmitting a first moving picture data based on the image data to the second mobile communication terminal while receiving a second moving picture data from the second mobile communication terminal; and
a processor configured to receiving a first signal for transmitting a still picture data while the wireless communication unit communicates with the second mobile communication terminal, wherein the wireless communication unit transmits the still picture data instead of the first moving picture data to the second mobile communication terminal when the processor receives the first signal.

16. The mobile communication terminal of claim 15, further comprising:
a display configured to display the second moving picture data while the wireless communication unit receives the second moving picture data.

17. The mobile communication terminal of claim 16, wherein the processor receives a second signal and the still picture is selected based on the second signal.

18. The mobile communication terminal of claim 17, wherein the first moving picture data includes a plurality of still pictures data and the still picture data selected from the first moving picture data.

19. The mobile communication terminal of claim 18, wherein the processor receives the second signal while the wireless communication terminal transmits the first moving picture data to the second mobile communication terminal.

20. The mobile communication terminal of claim 19, wherein the display further displays the still picture data while the wireless communication transmits the still picture data to the second mobile communication terminal.

21. A method for transporting a still picture using a mobile communication terminal, the method comprising:
capturing an image data;
transmitting a first moving picture data based on the image data to a second mobile communication terminal while receiving a second moving picture data from the second mobile communication terminal;
receiving a first signal for transmitting a still picture data while transiting the first moving picture data to the second mobile communication terminal; and
transmitting the still picture data to the second mobile communication terminal according to the first signal.

22. The method of claim 21, further comprising:
displaying the second moving picture data while the receiving second moving picture data.

23. The method of claim 22, further comprising:
receiving a second signal for selecting the still picture data.

24. The method of claim 23, wherein the first moving picture data includes a plurality of still picture data and the still picture is selected from the first moving picture.

25. The method of claim 24, wherein the second signal is received while transmitting the first moving picture data to the second mobile communication terminal.

26. The method of claim 25, further comprising:
displaying the still picture data while transmitting the still picture data.

\* \* \* \* \*